Oct. 10, 1950 D. D. GRIEG ET AL 2,524,789

MULTICHANNEL TIME MODULATED PULSE RECEIVING SYSTEM

Filed July 27, 1946

INVENTORS
EMILE LABIN
DONALD D. GRIEG

BY R. P. Morris
ATTORNEY

Patented Oct. 10, 1950

2,524,789

UNITED STATES PATENT OFFICE 2,524,789

MULTICHANNEL TIME MODULATED PULSE RECEIVING SYSTEM

Donald D. Grieg, Forest Hills, and Emile Labin, New York, N. Y., assignors to Federal Telephone and Radio Corporation, New York, N. Y., a corporation of Delaware Application July 27, 1946, Serial No. 686,731

4 Claims. (Cl. 179—15)

Figures 1, 2:
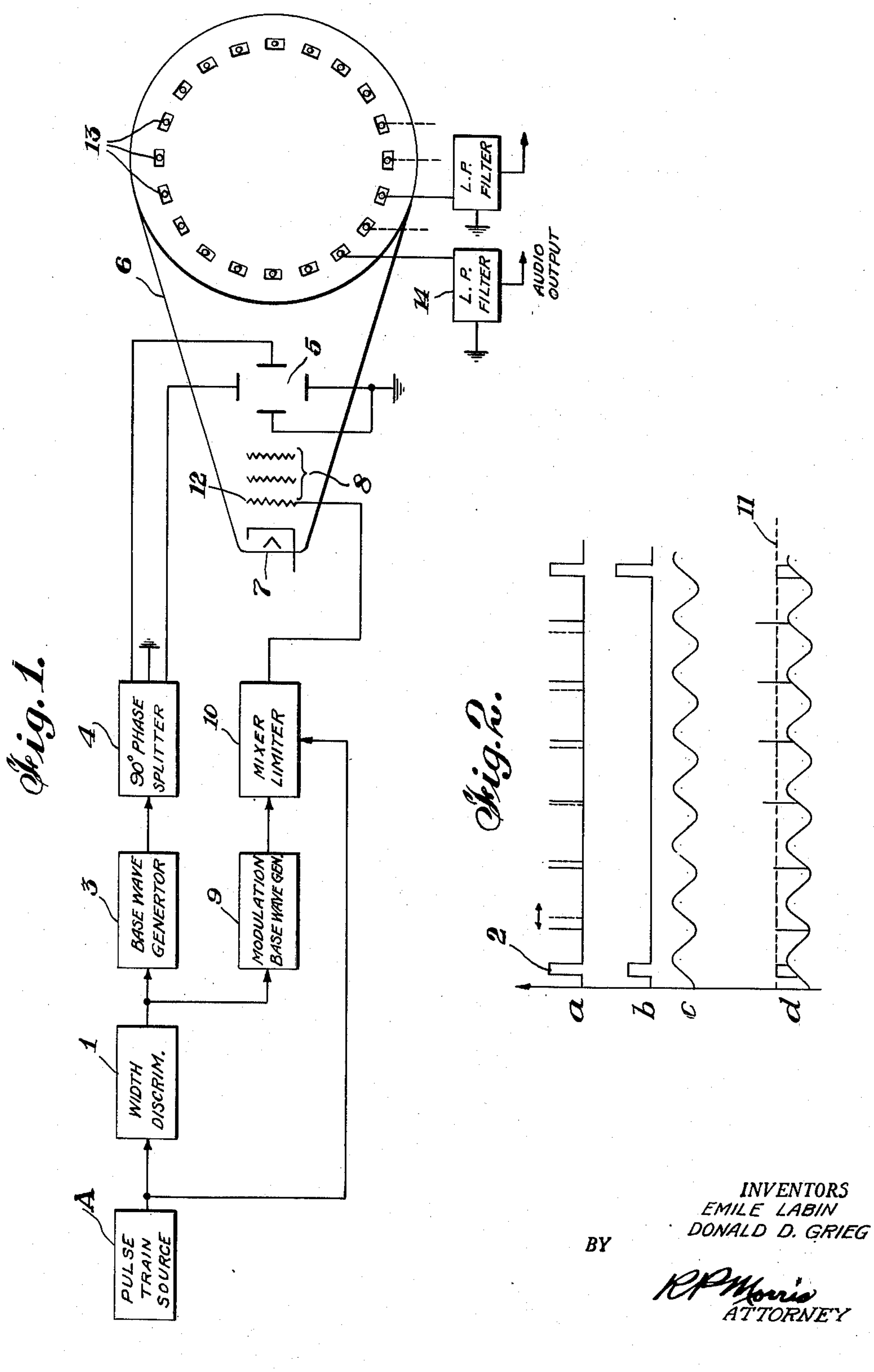

This invention relates to multi-channel receiving systems and more particularly to systems employing time modulated pulses for conveying intelligence having a demodulator of the cathode ray tube type.

In our co-pending application, Serial No. 565,152 filed Nov. 25, 1944, now U. S. Patent No. 2,465,380 dated March 29, 1949, there has been disclosed a receiving system comprising multichannel pulse demodulators of the cathode ray tube type wherein the train of pulses ordinarily including a synchronizing or marking pulse followed by pulses arranged in sequence for the individual channels. As the pulse train is received, the individual channel pulses are separated from the group of interleaved pulses and each individual channel series in turn is demodulated to finally result in suitable audio signals. The demodulation is effected by the relative timing of the beam with respect to the several target electrodes, and very precise timing is required to avoid distortion.

It is an object of the present invention to provide a receiving system for multi-channel time modulated pulse communication which provides a novel system for demodulation of all the channels involved as well as their complete separation within a single cathode ray tube.

A still further object is to provide a receiving system wherein the demodulation is effected by varying the intensity of a cathode ray beam according to the time displacement of the pulses of the various channels.

In accordance with our invention we provide a receiving system wherein a cathode ray tube of the multi-channel pulse distributor type serves as a means for separating the various channels from the train of pulses received. The pulses themselves are made to combine with a locally generated wave having a frequency which is synchronized with the repetition rate of the channels. The combination of these two waves has the effect of converting the various time modulated pulses into amplitude variations which are in that form applied to a control grid of the cathode ray tube. In effect the multi-channel time displaced pulses are thus converted into amplitude modulated pulses without separation of channels. The control grid thus supplied with amplitude varying pulsations causes the cathode ray beam to vary in intensity with the result that the output of the cathode ray tube for each channel varies in accordance with the original amplitude signal used to provide the modulation at the transmitter.

In accordance with another feature of our invention, the cathode ray tube which is generally similar to that disclosed in the above defined co-pending application in this instance has been provided with targets or apertures which are designed to serve only for separating the pulses from one another, the demodulating function being exercised by the control grid of the tube. A lateral displacement of the beam due to the phase or time modulation of the pulses has no effect on the output in this case since the targets or apertures are of sufficient width to be always within range of the beam in contrast with previous systems.

Other and further objects of the present invention will become apparent and the invention will be best understood from the following description of the embodiments thereof, reference being had to the drawings in which:

Figure 1 is a representation partly in block and partly in schematic form of a receiving system in accordance with our invention; and Figure 2 is a series of graphs illustrating certain operating conditions of the system of Figure 1.

Referring to the systems shown in Figure 1, the pulses after having been received from a pulse train source A are applied to a width discriminator circuit 1 wherein the marker or synchronizing pulses, as indicated at 2 in graph *a* of Figure 2, are separated out to provide a pulsation wave in accordance with graph *b*. The discriminator 1 may be one of many circuits known to be used for selecting synchronizing pulses, particularly those based on the discrimination of pulses according to width, since the marker pulse ordinarily is somewhat wider than the communication pulses of the various channels. The resulting wave in accordance with graph *b* is then applied to a base wave generator 3 which in the main comprises a shock excited tuned circuit which upon application of the separated marker pulse is productive of a sine wave of a given frequency related to a single channel repetition rate used for supplying the base voltage for deflecting the electron beam. The base wave, obtained from channel 3, is fed into a phase splitter circuit 4 to provide two waves with a 90° shift in respect to one another. The two waves are applied to one of the vertical and horizontal reflection plates 5 respectively of the cathode ray tube 6. The cathode ray tube 6 is shown to include a cathode 7 and a number of grids 8 which together with the deflection plates 5 constitute the generally known electron gun arrangement of such tubes.

The pulsations of the separated marker pulses in accordance with graph *b* are also applied to a modulation base wave generator 9 which may comprise a saw-tooth generator or a combination of a multi-vibrator and saw-tooth wave generator, or a filter for a harmonic sine wave such as indicated in graph *c*. This wave preferably has a portion of substantially linear slope which may be used for demodulation and is preferably controlled to provide a substantially constant amplitude. The resulting modulation base wave is applied to a mixer-limiter 10 which also receives the original pulses such as shown in graph *a*. Since the original pulses, as indicated, are each modulated in time in accordance with the signal to be transmitted and the modulation base wave from generator 9, has a frequency which is the same as that of the various successive channels, the effect of the combination of these waves will be that the respective pulses will assume various positions in respect to the "up" slope of the wave of graph *c* whereby pulses of varying amplitudes may be obtained by means of a clipping or limiting action indicated by the broken line 11. The resulting train of varying amplitude pulses above line 11 is then applied to control grid 12 of the tube 6 to control the intensity of the beam accordingly. The electron beam, thus varying in intensity in accordance with the amplitude of the pulse voltages applied to grid 12 which in turn are proportionate to their respective time or phase displacements, is being deflected in a circular path due to the two sinusoidal deflections voltages in quadrature applied to the deflection plates 5. The beam moves such that it follows a circle formed by apertures or targets 13 at the screen end of the tube. These collector plate targets or apertures are made sufficiently large so as to be in the path of the beam 7 for all positions due to the time modulation thereof. They must further be sufficiently narrow to separate the channels from one another. Thus, in contrast to previous systems, the electron beam will be within the confines of the respective elements 13 at all times regardless of its displacements due to the modulation in time or phase of the original pulses. The collector plates 13 at all times intercept the intensity varying beam and consequently produce an amplitude modulated series of pulses in the output circuit. Each of the channels is connected to a suitable low pass filter circuit 14 wherein the audio envelope is finally obtained from the amplitude variable pulses.

Since the details of similar cathode ray tubes have been disclosed, it will be sufficient to say that the end structure of such a tube may consist of a barrier plate comprising a series of radially disposed apertures, a dynode type secondary emission surface being disposed behind each aperture. In the present instance as already indicated, the dimension of both the apertures, as well as the targets, is sufficiently wide to allow for lateral displacements of the beam due to time modulation. The commutating action of the tube remains the same, with the current flow taking place in the local dynode-barrier plate circuit. In this manner the functions of the beam and of the collectors are separated and furthermore a greater external circuit current than is obtainable by the beam may be had.

It should be added here that base wave of graph *c* has a frequency which is chosen such that the time displacement of any pulse concurs during the extent of the linear portion thereof. The effect of this will be that when the pulse series is added to the modulation base wave, these pulses will ride up and down the wave in accordance with graph *d*.

It is to be noted also that in place of the suggested commutator construction involving internally arranged apertures and target plates, external means may be used for the same purpose. Such external means may utilize photo electric cells of various types together with suitable masking at the screen end of the tube.

While we have described above the principles of our invention in connection with specific apparatus, and particular modifications thereof, it is to be clearly understood that this description is made only by way of example and not as a limitation on the scope of our invention.

We claim:

1. A source of a multi-channel train of time modulated pulses including a marker pulse signal, electronic commutator means including an electron ray gun for producing an electron beam, means for causing the electron beam to have a movement in synchronism with the average pulse period per channel including a base wave generator, a marker pulse selector, connections applying said train to said selector, and connections applying the output of the marker pulse selector to energize said generator, a plurality of receiving channels, separate devices for each receiving channel arranged in a given relationship to the movement of said beam, whereby coactive coincidence between said beam and said devices takes place according to the occurrence of the pulses of each channel, and means for controlling the intensity of said beam in accordance with the time modulation of the pulses of each of said channels.

2. A system according to claim 1, wherein said devices comprise secondary emitting target elements for said electron beam producing secondary emission upon being impinged on by said beam.

3. A system according to claim 1, wherein said intensity controlling means includes a modulation base wave generator, and means for applying the output of said marker selector to energize said modulation generator and a circuit for combining said time modulated pulses and said modulation base wave, the frequency of the modulation wave being such as to have the linear portions thereof coincident with the time modulated pulses to cause a relative vertical displacement of said pulses when combined therewith in accordance with the time modulation thereof.

4. A source of a multi-channel train of pulses including a marker pulse distinguished by its width with respect to the other pulses, a width discriminator circuit for separating the marker pulse, means for applying said train to said discriminator circuit a base wave generator connected to be operatively energized by said discriminator circuit output to produce a wave having a frequency synchronous with the repetition rate of the channels, a phase splitting circuit fed by said generator, a modulation base wave generator connected to be operatively energized from said width discriminator for producing a wave having a frequency so that the linear portions thereof are coincident with pulses of the respective channels, circuit means for combining said pulses and said modulation wave to cause a relative vertical displacement of the pulses according to their time modulation, electronic commutator means including an electron ray gun for producing an electron beam, means for causing the electron beam to have a movement energized from said phase splitter, said beam thereby being made to move in synchronism with the average pulse period per channel, a plurality of receiving channels, separate devices for each receiving channel in said commutator means and arranged to intercept said beam with a given relationship to the movement of said beam, and means for controlling the intensity of said beam operatively controlled from said combining circuit means, whereby the signals from said devices to said receiving channels vary in amplitude in accordance with the time modulation of the respective channel pulses.

DONALD D. GRIEG.
EMILE LABIN.

REFERENCES CITED

The following references are of record in the file of this patent:

UNITED STATES PATENTS

| Number | Name | Date |
| --- | --- | --- |
| 2,185,693 | Mertz | Jan. 2, 1940 |
| 2,199,634 | Koch | May 7, 1940 |
| 2,250,528 | Gray | July 29, 1941 |
| 2,265,216 | Wolf | Dec. 9, 1941 |
| 2,391,776 | Fredendall | Dec. 25, 1945 |
| 2,395,467 | Deloraine | Feb. 26, 1946 |
| 2,403,210 | Butement | July 2, 1946 |
| 2,413,023 | Young | Dec. 24, 1946 |
| 2,423,466 | Peterson | July 8, 1947 |